Dec. 30, 1958 L. F. ASHFORD 2,866,663
TRUCK BODY FOR CASED AND PALLETIZED GOODS
Filed Jan. 18, 1955 5 Sheets-Sheet 1
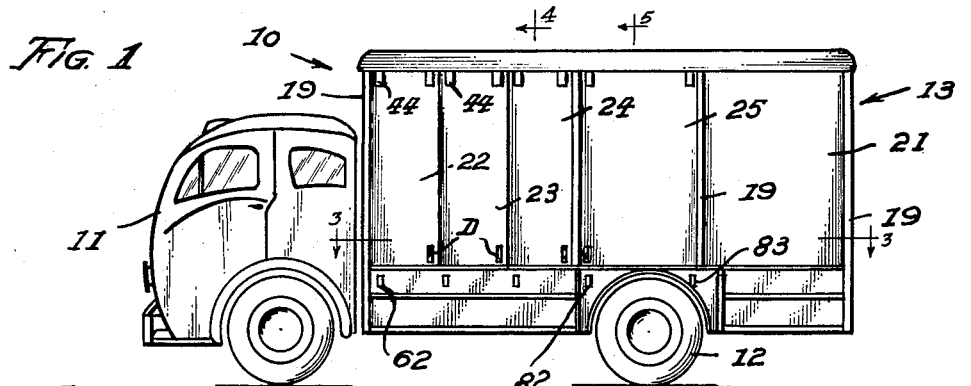
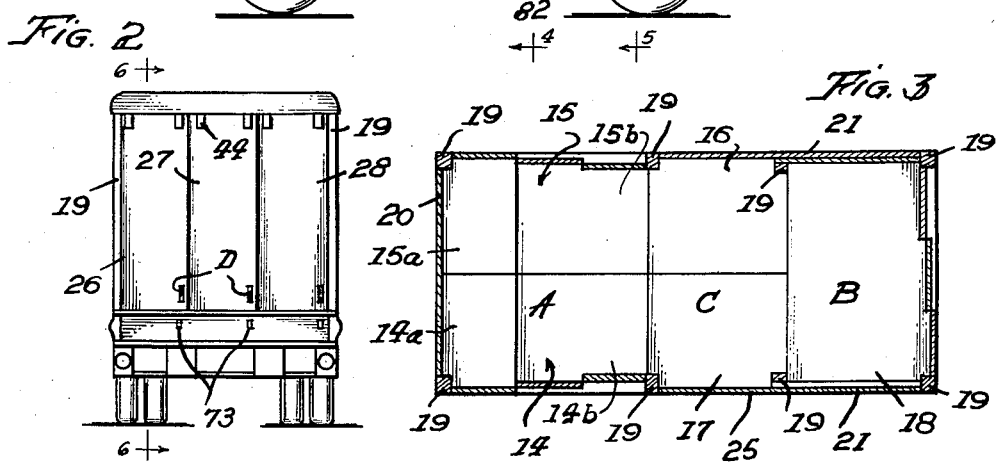
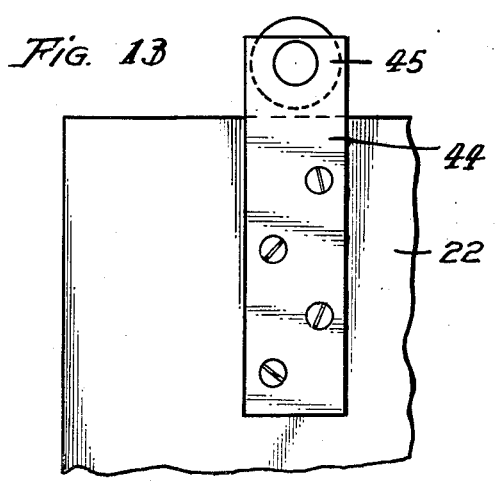
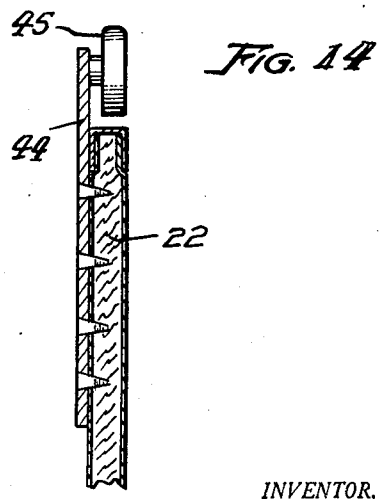
INVENTOR.
LEONARD F. ASHFORD
BY
Wm. N. Pattison
his attorney

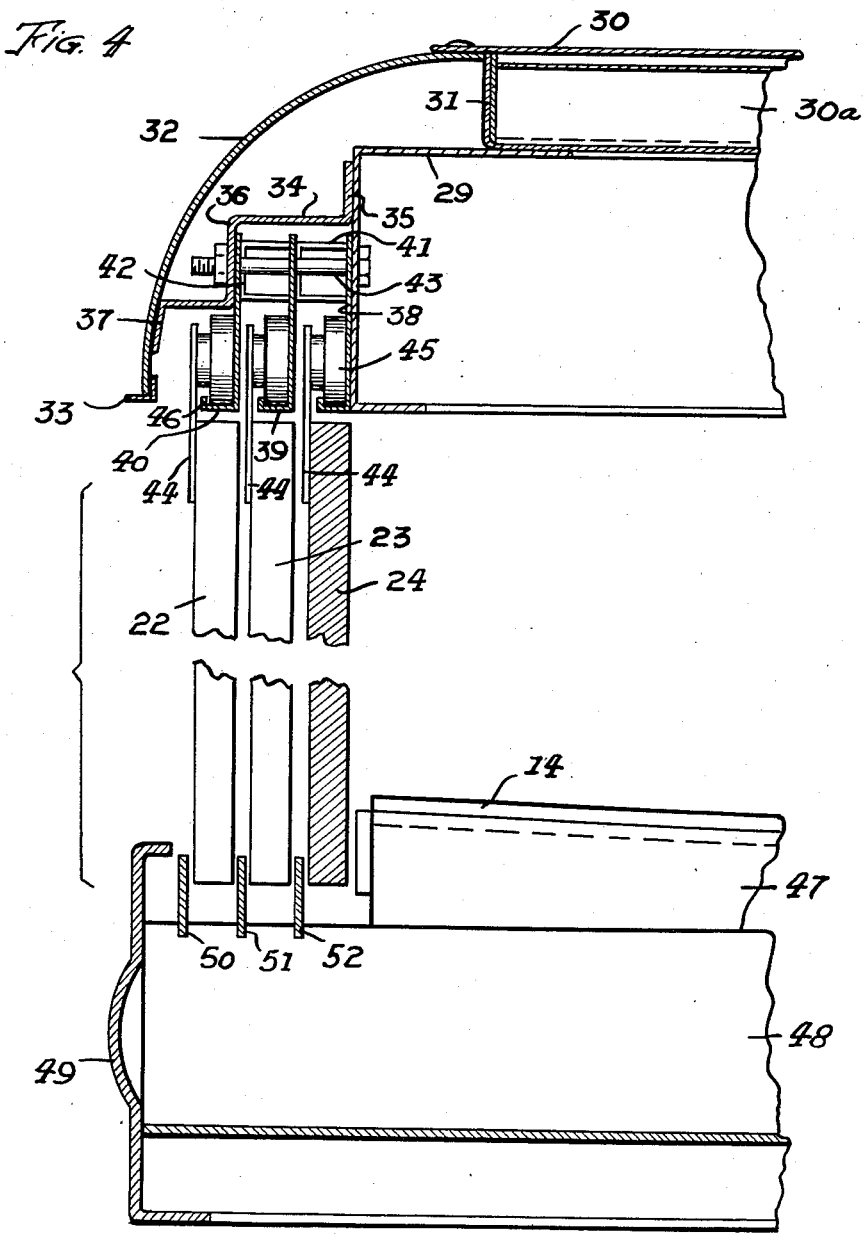

Dec. 30, 1958  L. F. ASHFORD  2,866,663
TRUCK BODY FOR CASED AND PALLETIZED GOODS
Filed Jan. 18, 1955  5 Sheets-Sheet 3
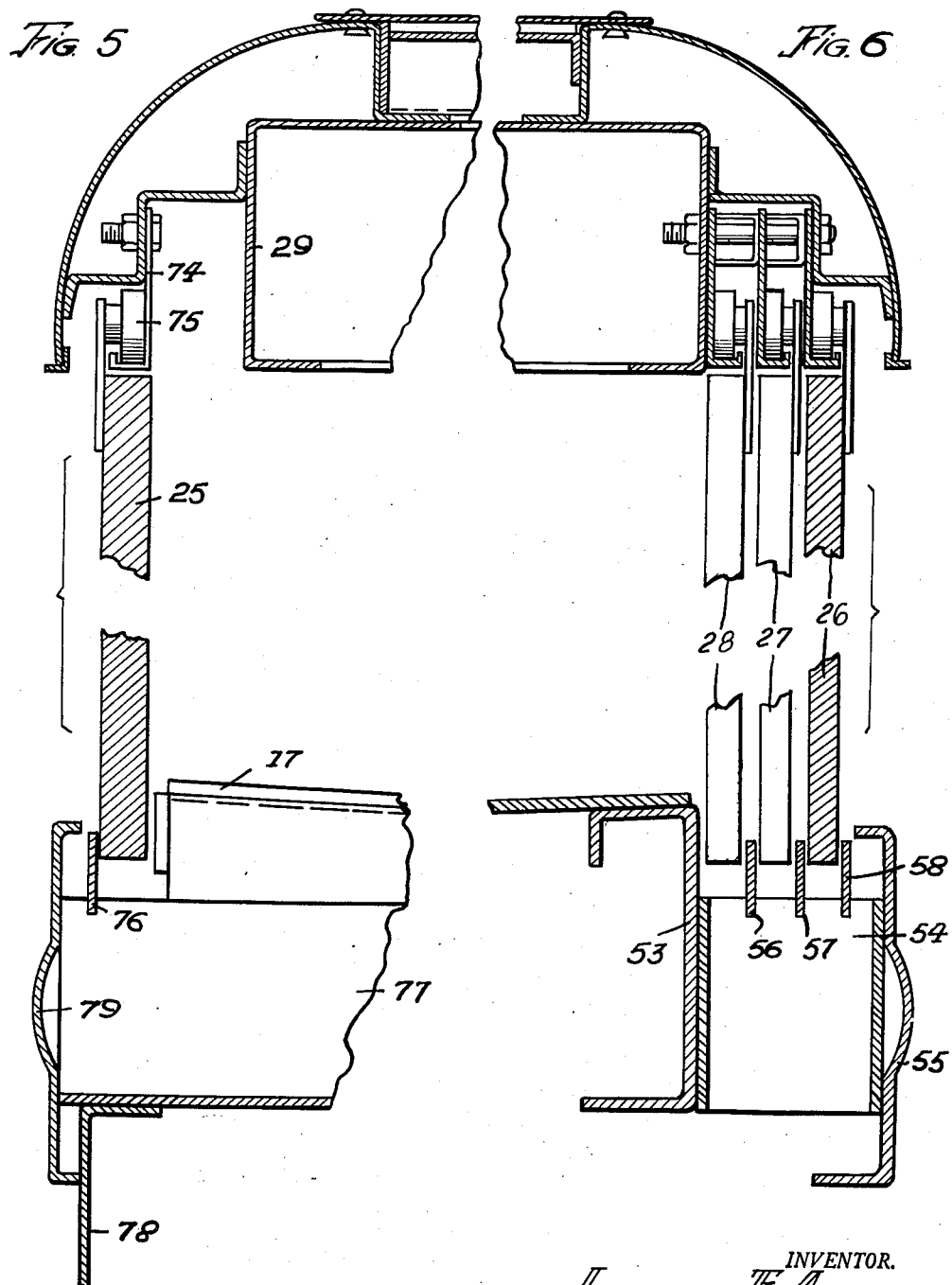

Dec. 30, 1958   L. F. ASHFORD   2,866,663
TRUCK BODY FOR CASED AND PALLETIZED GOODS
Filed Jan. 18, 1955   5 Sheets-Sheet 4
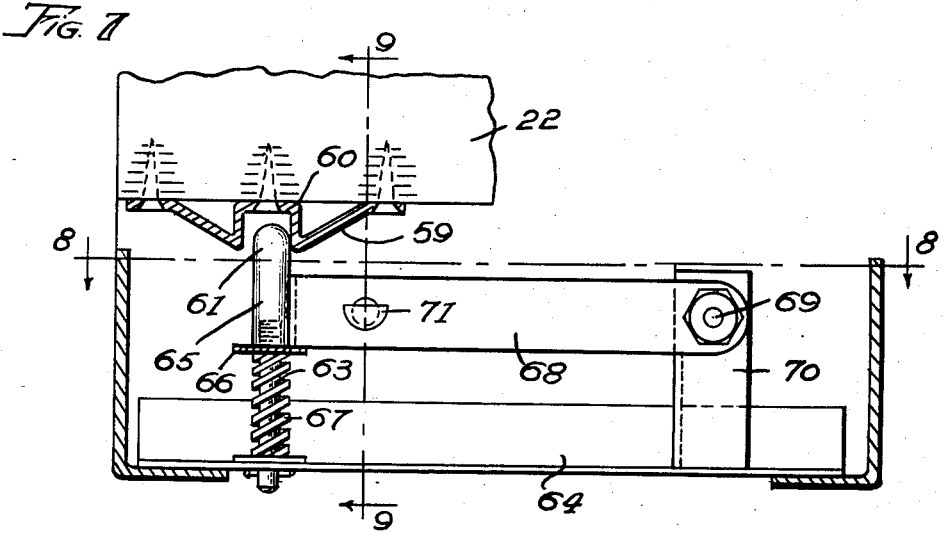
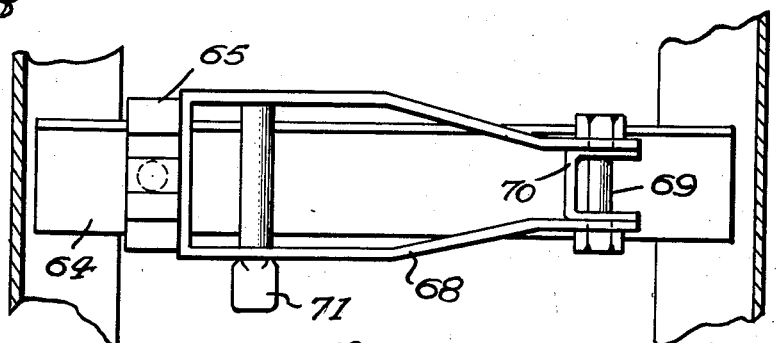
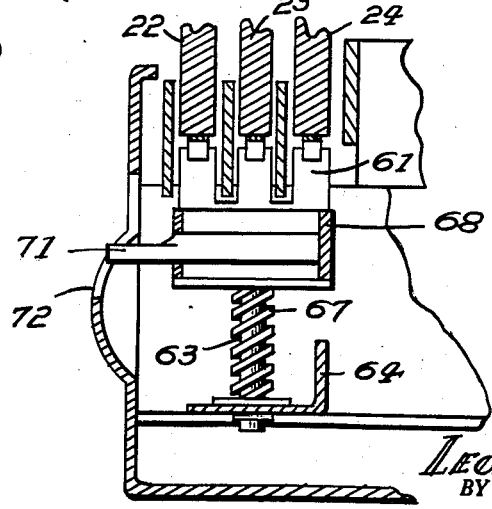
INVENTOR.
LEONARD F. ASHFORD
BY
Wm. N. Patterson
his attorney Dec. 30, 1958

L. F. ASHFORD 2,866,663

TRUCK BODY FOR CASED AND PALLETIZED GOODS

Filed Jan. 18, 1955

INVENTOR.
Leonard F Ashford
BY
Wm. N. Pattison
his attorney

United States Patent Office 2,866,663
Patented Dec. 30, 1958

2,866,663

TRUCK BODY FOR CASED AND PALLETIZED GOODS

Leonard F. Ashford, Philadelphia, Pa., assignor to Specialty Engineering Co., Philadelphia, Pa., a corporation of Pennsylvania Application January 18, 1955, Serial No. 482,504

7 Claims. (Cl. 296—24)

The present invention relates to automotive vehicles and more particularly and specifically to vehicular bodies particularly adapted to the transportation of cased and palletized goods wherein the body is constructed with a multiple of bins or compartments accessible from the sides and rear of the vehicle for loading and unloading purposes.

In present day commercial transportation of cased goods such as soft drinks and the like it is particularly desirable to provide vehicular truck constructions which are adapted to carry a maximum load and still transport the goods in such a manner and in such a condition as to make them readily accessible for loading and unloading in order to reduce to a minimum the time required in handling the goods in delivery.

Various prior art constructions have been devised for the purpose of meeting the needs incident to the transportation of cased goods of the type here concerned and certain improvements have resulted. However, there are still numerous disadvantages inherent in these prior constructions which result in the failure of these constructions to achieve many of the purposes for which they were designed.

Therefore it is a general object of the present invention to provide a vehicular truck construction for the transportation and handling of cased and palletized goods which eliminates many of the disadvantages inherent in prior constructions and which provides a novel and unique vehicle capable of achieving new and useful results in the commercial field for which it is particularly adapted.

A primary object of this invention resides in the provision of a truck construction capable of transporting a maximum load of cased or palletized goods while containing such goods in condition to be readily accessible for removal with the minimum time and labor requirements, and which is particularly adaptable for mechanical loading and unloading by currently used handling equipment.

It is another object of this invention to provide a truck construction adapted for the transportation of cased and palletized goods which enables the utilization of a closed body thereby permitting the protection of the goods against the elements of weather and the like and enabling the use of the truck construction with refrigeration equipment for the purpose of refrigerating the contents.

A further object of this invention is to provide a truck construction particularly adaptable to the transportation of cased and palletized goods in which the goods are loaded and discharged peripherally from both sides and the rear of the vehicle and are supported and secured within the vehicle by reason of the natural utilization of gravity, and a construction utilizing novel access arrangements to the goods therein.

Still another object of this invention is to provide a vehicle construction of the type described wherein the load-carrying area is completely enclosed and is provided on three peripheral sides thereof with sliding closure members which are so constructed and arranged relative to one another as to permit selective access to an isolated interior portion of the vehicle or which can be operated to open substantial areas through the enclosures to permit maximum access areas to the interior thereof.

It is a still further object of this invention to provide new and unique sliding door constructions for truck bodies of the type herein described which are so supported and arranged as to permit their operation in a variation of combinations to achieve the access advantages heretofore set forth.

Yet another object is the provision of a vehicular construction of the type described of novel and unique latch and latch control means for retaining the sliding closure members in body enclosing positions, and for selectively releasing said closures singularly or in selected combinations for ready access to desired areas within the body.

It is still another object and advantage of the present invention to provide a commercial truck construction of the type heretofore described which is of simple and inexpensive design and manufacture yet which provides an extremely durable and long-lasting construction requiring the minimum of maintenance and repair.

Still further objects and advantages of the present invention will become readily apparent to those skilled in the art when the following general statement and description are read in the light of the accompanying drawings.

The nature of the present invention may be stated in general terms as consisting of a commercial vehicle including an elongated bed section, a floor on said bed having an angular inclination downwardly and inwardly from both longitudinal sides thereof and from the rearward end thereof, a roof member supported in spaced relationship above said floor, a plurality of panels enclosing the sides of said construction intermediate the floor and roof members, the panels on the two longitudinal sides and the rear end forming a body and being divided into a plurality of sliding closure members, said sliding closure members being supported from points adjacent the roof member in a manner to permit them to move into and out of parallel juxtaposition serially to permit access openings to be provided of a width of one or a multiple of said panels, latch means supported from the bed of said vehicle having operative association with the lower ends of each of said closure members, and manual means accessible from externally of the body for selectively operating said latch means.

Referring now to the accompanying drawings in which like designations indicate similar parts throughout the several views:

Fig. 1 is a side elevation of the vehicular construction constituting the present invention.

Fig. 2 is a rear elevation of the vehicle.

Fig. 3 is a horizontal section taken on line 3—3 of Fig. 1.

Fig. 4 is a vertical section taken on line 4—4 of Fig. 1.

Fig. 5 is a vertical section taken on line 5—5 of Fig. 1.

Fig. 6 is a vertical section taken on line 6—6 of Fig. 2.

Fig. 7 is an enlarged vertical section illustrating the latch or lock construction.

Fig. 8 is a sectional view taken on line 8—8 of Fig. 7.

Fig. 9 is a top plan view in partial horizontal section of the construction illustrated in Fig. 7.

Fig. 13 is a fragmentary side elevation of the door hanging trolley.

Fig. 14 is a fragmentary end view of the construction illustrated in Fig. 13.

Figure 10:
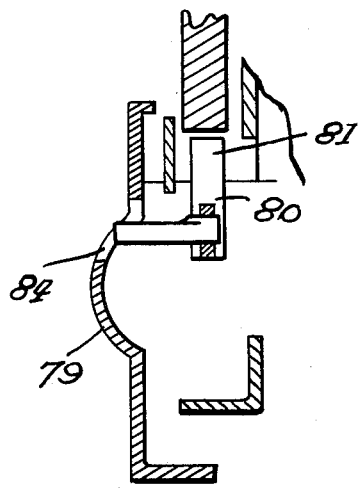
Fig. 10 is a vertical section illustrating a latch construction for a single door.

The vehicular truck construction constituting the present invention and generally designated at 10 in Figs. 1 and 2 of the drawings includes a cab 11 provided with an open bed body frame extending rearwardly from the cab, the frame being supported intermediate its length by wheels 12.

The body portion of the truck, generally designated at 13, which is mounted on the open bed framework rearwardly of the cab 11 consists basically of flooring supported across the open frame or bed, a roof supported horizontally above the flooring, and side enclosing body panelling extending between the flooring and the roof on all four sides peripherally about the flooring and the frame structure.

The frame construction supporting the body portion of the truck is of a conventional rectangular type wherein there are what is known as dropped frame or bed portions forwardly and rearwardly of the supporting wheels and an elevated or bridging frame portion immediately over the rear wheels. The flooring of the body section is divided into three sections A, B and C which correspond to the two dropped frame areas and the elevated frame area over the wheels respectively.

As best seen in Fig. 3, the flooring section A in the region of the forwardly dropped portion of the frame is divided longitudinally of the body center-line into two portions 14 and 15. Each of these floor portions is divided transversely into forward sections 14a and 15a and rearward sections 14b and 15b. The entire sections 14 and 15 are supported in angular inclination downwardly and inwardly from the side frame, while the forward sections 14a and 15a are additionally inclined downwardly in a forward direction.

The flooring of the elevated frame section C similarly consists of two flooring sections 16 and 17 divided at the longitudinal center line of the truck to extend in similar angular inclination upwardly and outwardly to the side of the frame where the frame bridges the supporting wheels 12 of the body.

The flooring section B in the rearward dropped frame portion of the vehicle consists of a single flooring section 18 which is supported on one longitudinal edge transversely of the body immediately adjacent the rearward end of the elevated frame section to extend angularly upwardly and rearwardly to be secured to the rear cross member of the frame.

Located at each corner of the body frame, front and rear, and at each corner of the elevated frame section on each side of the body are post members 19 which are suitably secured to the frame to extend vertically thereabove and which support the roof in a manner to be hereinafter described.

The four sides of the body portion of the truck are enclosed by panelling, a single fixed panel 20 closing the front end of the body between the frame and the roof in a vertical direction and between the front corner posts 19 in a horizontal direction. Similarly fixed panels 21 enclose those portions on the sides of the body between the rear corner posts thereof and the rearmost posts 19 defining the elevated frame section.

The remaining side portions on each side of the body are enclosed by sliding panels as is the rear end of the body. The details of the supporting structures for and arrangements of these sliding panels are to be hereinafter described. Both the fixed and sliding panels may be hollow or of metallic covered wood or composition construction with the sliding panels being provided on their outer face with indented finger grips D.

On both sides of the vehicle body, those areas forward of the elevated frame section bridging the wheels are enclosed on both sides of the body by three sliding panels or doors 22, 23 and 24 which are each of the same size and which are supported, in a manner to be hereinafter described, to permit the doors to slide in parallel relationship so that two doors may be moved to overlie one another and to overlie a third door providing an access opening into the body equal to the width of two of the doors.

A single enlarged sliding panel or door 25 is provided to enclose each side of the body in the elevated frame portion thereof, with these doors on either side of the body being capable of sliding rearwardly to position them in parallel juxtaposition with the fixed panels 21 enclosing the sides of the rearward dropped frame portion of the body, thereby providing full access from either side of the truck to the elevated frame portion of the body.

The rear end of the body of the truck is enclosed by three sliding doors or panels 26, 27, and 28 which are arranged in a similar manner to the panels in the forward side portions of the body so as to permit provision of an access opening in the rear of the truck equal to twice the width of the individual panels in a manner similar to that described for the forward side portions.

Turning now to the roof portion of the body, with particular reference to Fig. 4, the roof consists of a rectangular frame 29 substantially U-shaped in cross section which supports a metallic sheet roofing 30 and an insulating panel 30a at a spaced distance thereabove by means of a supporting bracket 31 which is secured on the top runner of the frame continuously thereabout.

The bracket 31 similarly supports an arcuate eave member 32 which extends from the peripheral edge of the roofing 30 outwardly and downwardly to enclose or cover the outer face of the frame at a spaced distance therefrom, and which can continuously thereabout support a rain guttering 33 at its lowermost and outermost edge.

The aforedescribed posts 19 which extend upwardly from their locations on the body frame or bed member have their upper extremities positioned adjacent the outer face of the roof frame member 29 intermediate the frame and the arcuate eave member where they are secured to the frame by welding, bolting or the like thereby securely supporting the roof member in its fixed position above the frame of the body.

As seen in Fig. 4, the roof frame 29 is provided longitudinally throughout those portions of its length above the front panels 22, 23 and 24 of the truck body with support means for slidably supporting the panels in their enclosing positions. This panel support means includes an elongated bracket 34 of double S-shaped configuration having the uppermost leg 35 of the S secured flush against the outer vertical face of the frame 29 thereby disposing the intermediate leg 36 in parallel with the outer face of the frame 29 and spaced intermediate the frame and the arcuate eave member 32. The third leg 37 of the S bracket is thereby located in parallel with the outer face of the frame 29 and in tight engagement against the inner face of the arcuate eave 32 where it may be secured in any suitable manner.

The bracket 34 supports three L-shaped track members 38, 39 and 40 in vertical spaced relationship intermediate the outer face of the frame and the arcuate eave 32. The track members 38 and 40 are located against the outer face of the frame 29 and the inner face of the intermediate leg 36 of the bracket 34 respectively, while the track 39 is supported intermediate the track members 38 and 40 being retained in its spaced relationship by means of spacer members 41 and 42 interposed between adjacent track members at spaced intervals along the length of bracket 34, the spacer members being supported substantially concentrically about hanging bolts 43 which are secured between the outer face of the frame 29 and the intermediate leg 36 of the bracket 34 and which project through the upper ends of each of the track members to support them in fixed vertical positions.

Each of the sliding panels 22, 23 and 24 is provided with a pair of flat hanging plates 44 which are secured to the outer face of the panel at spaced apart points along its upper edge, the plates 44 extending upwardly beyond the top of the panel for a spaced distance where their extremities are secured each to the stub axle of a ball bearing roller 45. The ball bearing roller is secured in each instance to the back face of the extended end of the hanging plate to locate it in substantial vertical alignment above the top end of the panel.

As seen in Fig. 4, the rollers of panel 22 are received and supported in the track 40 while the rollers of panels 23 and 24 are received and supported in the tracks 39 and 38 respectively. Each of the tracks is provided at the extended end of the bottom or foot member with an upturned lip 46 which retains the roller thereon against lateral displacement.

In accordance with the foregoing construction wherein each of the tracks 38, 39 and 40 extend longitudinally of the roof frame of the truck body throughout the length of that side area enclosed by the three panels 22, 23 and 24, it becomes apparent that each of the panels is slidable or movable on its respective track throughout the length of that portion of the truck forwardly of the elevated frame section in parallel overlapping relationship with each of the other panels. Thus, any one or two of the panels may be moved with respect to the other in order to provide an access opening which may be selectively equal to the width of one or two of the panels depending upon the combination in which the panels are moved.

Continuing to refer to Fig. 4 it is seen that the flooring 14 and its associated foundation 47 terminate at their outer ends substantially in vertical alignment beneath the outer face of the roof frame 29 thereabove while cross sill members 48 beneath the flooring and floor support extend outwardly of the frame beyond the end of the flooring to terminate substantially in vertical alignment below the outermost end of the arcuate eave member 32.

The outer ends of the cross sills 48 of the body frame carry a rub rail 49 which provides a finished facing member which extends continuously along both sides of the body front and rear of the elevated frame portion. The sliding panels 22, 23 and 24 extend downwardly so as to locate their lowermost ends in the pocket or chamber E formed above the top of the cross sills 48 between the inner face of the rub rail and the outer face of the flooring structure.

The upper faces of the cross sills 48 in the aforelocated pocket or chamber support three vertically extending door guides 50, 51 and 52 which are suitably secured in the upper faces of the cross sills to extend longitudinally of the frame beneath the hanging structure for the panels. The guides 50, 51 and 52 are spaced in parallel relationship to provide for the reception of the lower ends of the panels 22, 23 and 24 between the guides 50, 51 and 52 and the outer face of the flooring respectively.

The panels 26, 27 and 28 enclosing the back end of the truck body are supported at their upper ends by identical structure to that heretofore described relative to the panels 22, 23 and 24. Referring to Fig. 6 wherein there is illustrated the panel support for the rear end of the body it is seen that the rearmost cross member 53 of the body frame terminates in substantially vertical alignment below the rearmost face of the roof frame and a plurality of substantially U-shaped spacer members 54 are secured to the outer or rearmost face of the rear member 53 in spaced relationship along its length transversely of the body. A rub rail 55 is secured across the outermost faces of the spacer members 54 in substantial continuation of the rub rail 49 along the side of the truck rearwardly of the elevated frame portion, and the upper faces of the spacer members 54 support thereacross lower door guide members 56, 57 and 58 which serve to locate and retain the lower ends of the panels 26, 27 and 28 in the same manner as heretofore described relative to guides 50, 51 and 52.

Associated with the sliding panels 22, 23 and 24 on each forward side portion of the truck body and with the three panels 26, 27 and 28 enclosing the rear end of the body are lock or latch means which engage and retain the sliding panels in fixed positions along the lengths of their supporting track.

With particular reference to Figs. 7, 8 and 9, each latch means is shown to include a catch bracket 59 secured to the bottom of the sliding panel immediately adjacent the forward end thereof. Each of the brackets 59 includes a centrally located, inverted U-shaped keeper detent 60 for receiving upwardly therein a keeper or locking pin 61.

Each of the latching mechanisms, which are located at those points 62 on each side of the vehicle in direct alignment one below the forward end of each of the sliding panels in their normal closed position, includes a vertical rod 63 having its lower end extending through and retained beneath a fixed channel member 64 and which carries on its upper end a latch fixture 65. The latch fixture includes a flanged base 66 having three vertically extending parallel spaced locking pins 61, one beneath each of the sliding panels 22, 23 and 24 so located as to engage in the detent 60 of the bracket 59 carried by each of the panels. Interposed between the underside of the flange base 66 of the latching member and the upper face of the supporting channel 64 is a coil spring 67 which is concentrically located about the rod 63 normally urging the rod and the latching member upwardly to bring the locking pins 61 into engagement with the detents 60.

The latching member 65 carries a yoke-like actuating lever 68 extending in substantially horizontal projection therefrom with the extended end of the lever being rotatably fixed on a fulcrum formed by a pin 69 supported transversely of a U-shaped post 70 supported on the channel member 64. The lever bar 68 extends horizontally from the latching member 65 in a direction longitudinally of the truck frame and carries intermediate its length a tripping handle 71 which projects transversely of the yoke-like lever outwardly through a vertical slot 72 in the rub rail 49 directly outwardly therefrom.

From the foregoing description it is evident that the spring 67 will normally urge the latching member 65 upwardly to locate the locking pins 61 in engagement with the locking detents 60 on one or more of the sliding panels dependent upon their location longitudinally of the truck, and the panels may be released for movement by depressing the tripping lever 71 where it projects outwardly through the rub rail 49 causing the lever 68 and the latching member 65 to pivot about the fulcrum pin 69 downwardly against the tension of spring 67 to withdraw the latching pins from their engagement with the bracket detents 60.

By locating a locking construction of the type heretofore described one beneath each of the forward ends of the sliding panels 22, 23 and 24 when they are in their normal closed positions it can be seen that one or more panels may be engaged and latched by any one of the latching mechanisms so that the panels may be maintained in open position as well as assuring their retention in closed positions.

Latch constructions of the type aforedescribed are also provided at points indicated at 73 across the rear end of the truck one beneath each of the corresponding ends of the sliding panels 26, 27 and 28 to provide for identical locking action for these panels as that described relative to panels 22, 23 and 24.

In Fig. 5 there is illustrated a modification of the panel hanging structure illustrated in Figs. 4 and 6, this modified structure being that utilized for supporting the single sliding panels 25 which enclose the side portions of the elevated frame structure of the body. In this modification a single track member 74, which may be a continuation of track 40 aforedescribed, is supported against the inner face of the intermediate leg 36 of the bracket 34 to receive therein the rollers 75 connected to the upper end of the sliding panel 25 to slidably suspend the panel from the roof frame 29.

At the lower end of panel 25 a single door guide member 76 is supported in the upper face of cross sills 77 of the elevated frame structure. The door guide 76 is spaced outwardly from the flooring 17 of the elevated frame structure to form therewith a bottom guide trough for the lower end of the panel 25.

A fender skirt 78, Fig. 5, is secured to the underside of the cross sills 77 of the elevated frame structure immediately inward from the lower end of a rub rail 79 secured to the outer face of the cross sills, said fender skirt bridging the supporting wheel 12 intermediate the rub rail member 49 forwardly and rearwardly of the elevated frame section.

As seen in Fig. 10 a latch construction is provided for engaging the bottom edges of sliding panels 25 in either their open or closed position. Said latch construction is identical in all respects to that heretofore described with respect to Figs. 7 through 9 except that the latching member 80 in this construction includes only a single keeper or locking pin 81 extending thereabove for engaging a single detent bracket on the bottom of the panel. Latch constructions of this type are located beneath the forward ends of the panels 25 at 82 to engage the locking detents on the forward bottom ends of the panels to lock the panels in closed positions, and second latches are provided at 83 directly below the rearward ends of the panels to engage the locking detents on the forward ends of the panels when the panels are moved rearwardly to full open positions. Slots 84 are provided in the rub rail 79 opposite the locations of both latches to permit access to the tripping handles of these latch constructions.

Figure 12:
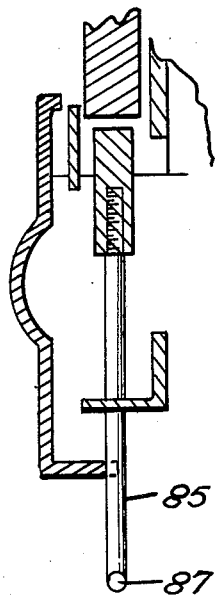
Fig. 12 is a plan view in partial horizontal section of the construction illustrated in Fig. 11.
Figure 11:
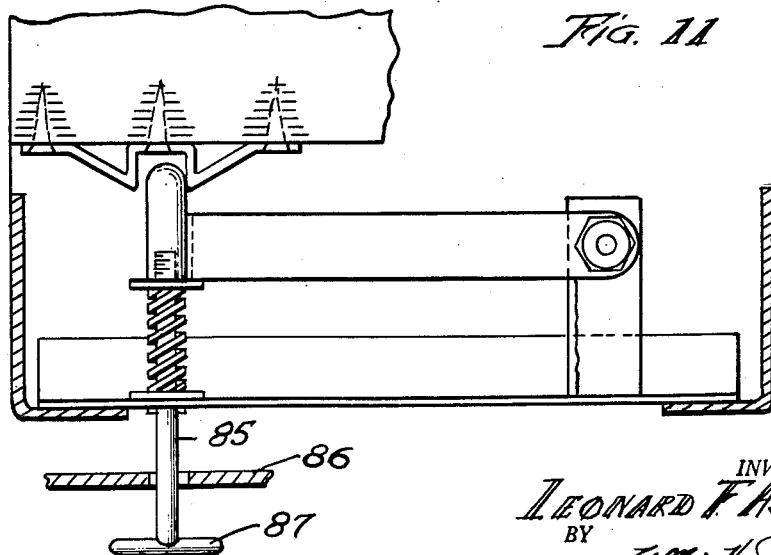
Fig. 11 is a sectional view illustrating a modified form of the latch operating means.

In Figs. 11 and 12 there is illustrated a modified form of the latch constructions heretofore described wherein the latch mechanisms are substantially identical to those heretofore described except that the tripping handle is replaced by an extension 85 on the lower end of the latch rod 63 below the channel support 64, wherein said extension 85 projects below the bottom flange 86 of the rub rail and carries on its lowermost extended end a handle 87 of the T-type or the like for manual depression of the latching member. By projecting below the rub rail flange the handle 87 of the latch rod 85 is readily accessible from a point outside of the body for the purpose of being pulled or pushed downwardly to selectively release the sliding panels for movement on their tracks.

From the foregoing description it is readily evident that unique and useful improvements have been provided by the combinations and sub-combinations constituting the present invention which result in the new and useful functions derived from their operation.

It is apparent that novel constructions have been provided which attain and accomplish all of those objects and advantages heretofore set forth to the end result of providing a vehicular truck construction which is superior structurally and functionally over those of the prior art.

Accordingly, having fully described and explained my invention and having clearly set forth its advantages and novel construction, what I desire to claim is:

1. A truck body including a frame, said frame being divided into front, central and rear sections, a roof supported horizontally in spaced relationship above said frame, flooring supported on said frame, the flooring on said front and central sections being inclined from the sides downwardly and inwardly toward the longitudinal center of said body, the flooring of said rear section being inclined downwardly and inwardly from the rear end of said body forwardly to the rear end of said central section, a plurality of sliding panels arranged for parallel horizontal movement both to the right and to the left relative to and independent of one another enclosing both sides of the forward section and the rear end of said body, fixed panels enclosing the sides of said rear section of said body, and single sliding panels enclosing each side of the central section of said body movable in parallel adjacency to said fixed panels.

2. A truck body construction as defined in claim 1 wherein said roof supports a plurality of track members longitudinally above the sides of said frame and above the rear end thereof, said sliding panels having support rollers extending thereabove and engaging said track members, and the rollers of each of said plural panels being supported on different parallel track members to locate them in parallel sliding adjacency.

3. A truck body construction as defined in claim 1 wherein latch means are carried by said frame below said sliding panels, said latch means being selectively engageable with said sliding panels when the panels are in either their open or closed positions for retaining them in selected adjusted positions.

4. A truck body construction as defined in claim 1 wherein sill means are provided on said frame below said sliding panels, said sill means including longitudinal pockets for slidably receiving the lower ends of said panels, and upstanding guide members extending in parallel spaced relationship interposed between adjacent panels for retaining said panels in parallel spaced relationship.

5. A truck body construction as defined in claim 1 wherein vertical posts are secured to and extend above the frame, a substantially rectangular frame supported on the upper ends of said posts centrally above the lower frame, elongated brackets secured longitudinally of the outer faces of said upper rectangular frame, elongated tracks secured to and depending from said brackets above the peripheral edges of the lower frame, rollers engaged in said tracks, said rollers being secured to and supporting said sliding panels, and said roof being secured to and supported from the outermost extremities of said brackets.

6. In combination with a truck body having a horizontal frame and a roof supported horizontally in spaced relationship above said frame, a plurality of parallel track members supported above the peripheral edges of said frame, a plurality of panel members slidably supported from said track members in parallel side by side relationship and movable relative to and independently of one another, said frame having sill means for receiving and guiding the lower ends of said sliding panels, detents provided in the lowermost edges of each of said panels, a lever extending transverse the truck body and being horizontally pivotally supported on the body frame below the frame sill, the lever carrying a plurality of vertically extending pins disposed in spaced relationship transverse the lever, each of said pins being aligned vertically beneath one of said sliding panels, means normally biasing said lever in an upwardly direction for engaging the pins with said detents and an operative means secured to said lever for manually depressing the lever against said biasing means for disengaging the pins from the detents.

7. In combination with a truck body having a horizontal frame and a roof supported horizontally in spaced relationship above said frame, a plurality of parallel track members supported above the peripheral edges of said frame, a plurality of panel members slidably supported from said track members in parallel side by side relationship and movable relative to and independently of one another, said frame having sill means for receiving and guiding the lower ends of said sliding panels, detents provided in the lowermost edges of each of said panels, pin means reciprocably mounted on said frame below said sill, means normally biasing said pins in an upward direction into engagement with said detents, lever means secured to and extending horizontally from said pin means for manually depressing said pins against their bias, said frame being provided with a facing member secured vertically about the outer peripheral edge thereof, said facing member being provided with vertically slotted openings therein adjacent each of said pin means along the length of said frame, and each of said horizontally extending lever means projecting outwardly through one of said slotted openings in said facing member.

References Cited in the file of this patent

UNITED STATES PATENTS

| | | |
|---|---|---|
| 1,050,699 | Schmitt | Jan. 14, 1913 |
| 1,341,744 | Hatch | June 1, 1920 |
| 1,534,210 | Griffith et al. | Apr. 21, 1925 |
| 1,882,536 | Weinheimer | Oct. 11, 1932 |
| 1,890,257 | Hafner et al. | Dec. 6, 1932 |
| 1,919,387 | Stringer | July 25, 1933 |
| 2,320,216 | Brister | May 25, 1943 |
| 2,650,856 | Mashburn et al. | Sept. 1, 1953 |
| 2,684,506 | Tadd | July 27, 1954 |
| 2,703,158 | Hauck | Mar. 1, 1955 |
| 2,777,315 | Burke | Jan. 15, 1957 |

OTHER REFERENCES

"Bottlers' Body," in "Commercial Car Journal," vol. LXXX, issue 4, December 1950, pages 62, 63 and 114.